United States Patent [19]

Lindau

[11] 4,274,842
[45] Jun. 23, 1981

[54] METHOD OF PURIFYING GAS CONTAINING GASEOUS MERCURY

[75] Inventor: Leif A. V. Lindau, Växjö, Sweden

[73] Assignee: AB Svenska Flaktfabriken, Stockholm, Sweden

[21] Appl. No.: 111,126

[22] Filed: Jan. 10, 1980

[30] Foreign Application Priority Data

Jan. 10, 1979 [SE] Sweden ............................. 7900209

[51] Int. Cl.$^3$ ............................................ B01D 53/12
[52] U.S. Cl. ......................................... 55/72; 55/77
[58] Field of Search ................. 55/72, 74, 77, 79, 387, 55/390; 210/38 B, 50–53; 423/99, 107, 210 S, 215.5

[56] References Cited

U.S. PATENT DOCUMENTS

| 3,232,033 | 2/1966 | Williston et al. ..................... 55/387 |
| 3,257,776 | 6/1966 | Park et al. ............................. 55/72 |
| 3,647,359 | 3/1972 | Bell ....................................... 423/99 |
| 3,786,619 | 1/1974 | Melkersson et al. .................. 55/72 |
| 3,849,533 | 11/1974 | Hetz ..................................... 423/99 |
| 3,956,458 | 5/1976 | Anderson .......................... 55/72 X |
| 4,087,515 | 5/1978 | Miller ................................. 423/99 X |
| 4,196,173 | 4/1980 | deJong et al. ...................... 423/210 |

FOREIGN PATENT DOCUMENTS

360988 10/1973 Switzerland .

OTHER PUBLICATIONS

Culp et al., *New Concepts in Water Purification*, Heavy Metal Removal, pp. 218–229, 1974.

*Primary Examiner*—Robert H. Spitzer
*Attorney, Agent, or Firm*—Dann, Dorfman, Herrell & Skillman

[57] ABSTRACT

A method of highly efficiently separating preferably low contents of gaseous mercury from a gas mixture, where the gas mixture is caused to contact a solid sorbent consisting of powdered calcium hydroxide, which in an atmosphere containing hydrogen chloride is to a certain part converted to calcium chloride. The temperature of the gas mixture is between 350° K. and 550° K. The contact between the gas and the sorbent preferably takes place in a fluidized bed, whereafter the sorbent is separated in a dust separator. The method is suitable for use at the separation of mercury occurring in flue gases, for example from refuse incinerators or in mercury-containing gases from process industries. At experiments with flue gas from a refuse incinerator the mercury content was reduced from 200 to 5 µg of gaseous mercury/cubic meter flue gas.

3 Claims, No Drawings

METHOD OF PURIFYING GAS CONTAINING GASEOUS MERCURY

This invention relates to a method of purifying gas containing gaseous mercury according to the preamble of the attached claim 1.

Besides from process industries using mercury, mercury also is emitted in flue gases, for example, from refuse incinerators. That emission part which is in particle state, can be separated by conventional dust separation technique. A great portion of the mercury emission, however, often is in the form of gaseous pollution which, besides, occurs in very low contents and, therefore, is difficult to separate.

Known methods of separating mercury from gas mixtures are such, at which the gas mixture is caused to contact a liquid sorbent, or such, at which the mixture is caused to contact a solid sorbent. The present invention relates to the latter category. Examples of such known methods are disclosed in SE-PS No. 360 988, where the gas mixture is brought into contact with selenium or selenium compounds, or in U.S. Pat. No. 3,232,033 where the gas mixture is caused to contact metals having a strong tendency of forming amalgam, such as nickel, silver or gold. The method according to said Swedish patent is adapted for separating mercury, which occurs in high contents as, for example, at the manufacture of sulphuric acid. One disadvantage of the method is the very high price of selenium. The method according to said U.S. patent was developed for a process of manufacturing hydrogen gas, where the gas temperature is high and the mercury contents are high.

The aforesaid known methods have in common that they should not work at the high gas temperatures and low mercury contents prevailing, for example, in the flue gases from a refuse incinerator.

The present invention has the object to render available a method, by which gases of the aforesaid kind are efficiently purified from gaseous mercury. This object is achieved by a method having the characterizing features in that the gas, at a temperature between 350° Kelvin and 550° Kelvin, is caused to contact a solid sorbent, preferably in a fluidized bed, the sorbent consisting of powdered calcium hydroxide and of reaction products from the reaction between calcium hydroxide and gaseous hydrogen chloride, whereafter the sorbent is separated in a dust separator. It was found by surprise that the method according to the invention brings about a highly efficient separation of low gaseous mercury contents, as is elucidated in the example as follows.

In a gas purifying plant comprising a gas inlet provided with a batching equipment for powdered material and a subsequent reactor of the so-called "expanded fluidized bed"-type, followed by a dust separator, a partial gas stream of the flue gases from a refuse incinerator was introduced. In the batching equipment hydrated technical lime was batched in an amount of between 3 and 0,5 g per cubic meter flue gas, which contained about 200 $\mu$g gaseous mercury per cubic meter flue gas. Other pollutions in the flue gas were a.o. hydrogen chloride and sulphur dioxide. The gas had a temperature of between 250° C. and 150° C. and was passed through the gas purification equipment. When the mercury content was measured at the outlet from the dust separator, it was found that the gaseous mercury content had decreased to about 5 $\mu$g gaseous mercury per cubic meter flue gas.

I claim:

1. A method of purifying gases containing gaseous mercury, characterized in that the gas is caused to contact a solid sorbent consisting of powdered calcium hydroxide and of reaction from the reaction between calcium hydroxide and gaseous hydrogen chloride, whereafter the sorbent is separated in a dust separator.

2. A method as defined in claim 1, characterized in that the contact between the gaseous mercury and the sorbent takes place in a fluidized bed.

3. A method as defined in claim 1 or 2 characterized in that the temperature of the gases containing gaseous mercury is in the range between 350° K and 550° K.

* * * * *

UNITED STATES PATENT AND TRADEMARK OFFICE
CERTIFICATE OF CORRECTION

PATENT NO. : 4,274,842
DATED : June 23, 1981
INVENTOR(S) : Leif Lindau

It is certified that error appears in the above-identified patent and that said Letters Patent are hereby corrected as shown below:

Claim 1, line 4, after "reaction" (first occurrence) insert --products--.

Signed and Sealed this

Twenty-fifth Day of August 1981

[SEAL]

Attest:

Attesting Officer

GERALD J. MOSSINGHOFF

Commissioner of Patents and Trademarks